United States Patent [19]
Mahant-Shetti

[11] Patent Number: 5,930,160
[45] Date of Patent: Jul. 27, 1999

[54] MULTIPLY ACCUMULATE UNIT FOR PROCESSING A SIGNAL AND METHOD OF OPERATION

[75] Inventor: Shivaling S. Mahant-Shetti, Garland, Tex.

[73] Assignee: Texas Instruments Incorporated, Dallas, Tex.

[21] Appl. No.: 08/822,164

[22] Filed: Mar. 21, 1997

Related U.S. Application Data

[60] Provisional application No. 60/013,954, Mar. 22, 1996.
[51] Int. Cl.$^6$ ............................................. G06F 7/00
[52] U.S. Cl. ............................................. 364/750.5
[58] Field of Search ........................... 364/750.5, 724.16

[56] References Cited

U.S. PATENT DOCUMENTS 4,156,876  5/1979  Debuisser ........................... 364/724.16

OTHER PUBLICATIONS

Chevillat et al, "Pipelined hardware multiplier with extended precision", IBM Tech. Discl. Bull. vol. 23 No. 9, Feb. 1981 pp. 4322–4323.

*Primary Examiner*—Tan V. Mai
*Attorney, Agent, or Firm*—Robert D. Marshall, Jr.; Gerald E. Laws; Richard L. Donaldson

[57] ABSTRACT

A multiply accumulate unit processes a signal according to a sum-of-products function based upon a plurality of multibit sampled values and a corresponding plurality of multibit constants. A multiply-add block receives the sampled values and the constants. A portion of each constant is selected. A plurality of multipliers multiple sampled values and selected portions of the corresponding constants. The products are added and shifted corresponding to the significance of the selected portion of the constants. These are added to generate a sum of sequential outputs of the multiply-add block. The multiply accumulate unit repeats operation employing the same sample values but portions of said corresponding constants having sequentially less significant bits. This sequence repeats until the sum of all prior sum-of-products functions has a desired level of accuracy.

8 Claims, 4 Drawing Sheets

MULTIPLY ACCUMULATE UNIT FOR PROCESSING A SIGNAL AND METHOD OF OPERATION

This application claims priority under 35 U.S.C. § 119 of provisional application Ser. No. 60/013,954, filed Mar. 22, 1996.

TECHNICAL FIELD OF THE INVENTION

This invention relates in general to the field of electronic circuits, and more particularly to a multiply accumulate unit for processing a signal and a method of operation.

BACKGROUND OF THE INVENTION

Processing a signal by determining the result of a sum-of-products function often is important to the operation of digital signal processors and forms the basis for transforms used in MPEG algorithms and used by various filters. A sum-of-products function generally comprises calculating results of the form:

$$Y=(C_0 {}^*X_0)+(C_1{}^*X_1)+(C_2{}^*X_2)$$

where $(C_0,C_1,C_2,\ldots)$ are constants and $(X_0,X_1,X_2,\ldots)$ are values sampled from a signal being processed. Often, the constants $(C_0,C_1,C_2\ldots)$ are fixed numbers, but sometimes they are allowed to vary.

Determining the result of a sum-of-products function is typically accomplished using a multiply accumulate unit which comprises a multiplier and an adder. In a conventional multiply accumulate unit, the multiplier and adder are used in sequence to compute a product of each term $(C_i{}^*X_i)$ and to add that product to a partial sum such that a new term is added each cycle. The result Y is valid only after all terms have been added, and truncated if necessary. The number of cycles needed for the computation is hence independent of the accuracy required.

In some custom implementations, noting that multiplication can be accomplished using a set of adders, an optimized structure can be obtained by deleting adders associated with zero bits in the coefficients $(C_0,C_1,C_2,\ldots)$. Coefficients $(C_0,C_1,C_2,\ldots)$ can also be chosen to contain a large number of zeroes if the application permits. Many circuits also make use of the fact that subtraction is as efficient as addition and use canonical signed digit representation (CSD) for the constants $(C_0,C_1,C_2,\ldots)$ to reduce the number of adders required in the circuit. This reduction in adders allows a reduction of the size of the circuit.

However, these implementations suffer from the problem that in order to provide a result they need enough cycles to calculate each term $(C_i{}^*X_i)$ irrespective of the needed accuracy of the results.

SUMMARY OF THE INVENTION

In accordance with the present invention, a multiply accumulate unit for processing a signal and a method of operation are provided that substantially eliminate or reduce disadvantages and problems associated with prior electronic circuits.

According to one embodiment of the present invention, a multiply accumulate unit is provided for processing a signal according to a sum-of-products function based upon a plurality of sampled values and a corresponding plurality of constants. The multiply accumulate unit includes a first-order block operable to receive the plurality of sampled values. The first-order block is further operable to generate a first-order approximation of the sum-of-products function and to provide an output representing the first-order approximation where the sum-of-products function is characterized by the plurality of constants. A correction block is also operable to receive the plurality of sampled values. The correction block is further operable to generate a correction to the first-order approximation and to provide an output representing the correction. An adder is coupled to receive the output of the first-order block and the output of the correction block. The adder is operable to provide an output representing the sum of the first-order approximation and the correction such that the output provides a result of processing the signal according to the sum-of-products function.

According to another embodiment of the present invention, a multiply accumulate unit is provided for processing a signal according to a sum-of-products function based upon a plurality of sampled values and a corresponding plurality of constants. The multiply accumulate unit includes a multiply-add block which is operable to receive the plurality of sampled values and to receive a portion of each of the plurality of constants. The multiply-add block is further operable to provide an output representing a sum of each sampled value multiplied by the portion of a corresponding constant. An adder is coupled to receive the output of the multiply-add block and is operable to generate a sum of sequential outputs of the multiply-add block. The adder is further operable to provide an output representing the sum of sequential outputs of the multiply-add block such that the output provides a result of processing the signal according to the sum-of-products function.

The processing of a signal according to a sum-of-products functions by generating a series of approximations is a technical advantage of the present invention. This approach allows specifiable accuracy and selection of higher speed or less silicon area versus accuracy as a design trade-off.

Another technical advantage of the present is the use of a double adder structure and adaptive multiplication factors compatible with product form realization to implement a multiply accumulate unit for processing a signal.

A further technical advantage of the present invention is a reduced die area, higher speed and lower power multiply accumulate unit. The present invention is beneficial to devices such as digital signal processors, MPEG filters, HDTV and telecommunication devices, and analog-to-digital converters.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
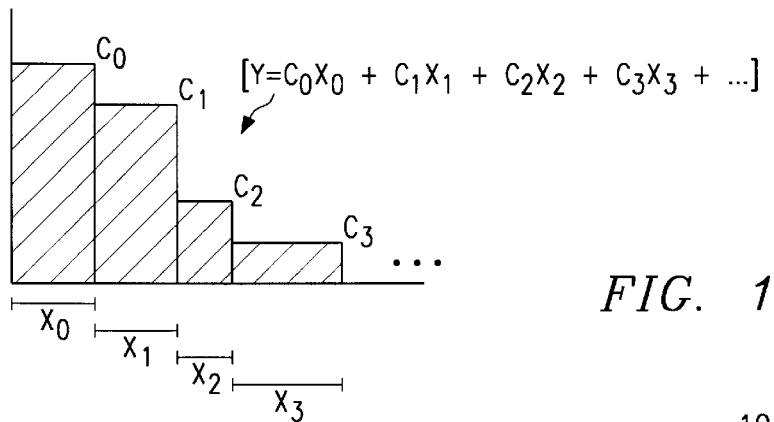
FIG. 1 is a graphical representation of a result of a sum-of-products function.

FIG. 1 is a graphical representation of a result of a sum-of-products function. As shown in FIG. 1, the result of the following sum-of-products function.

$$Y = C_0X_0 + C_1X_1 + C_2X_2 + \ldots$$

can be represented graphically as the area formed by rectangles of sides $X_i$ and $C_i$. According to the teachings of the present invention, an efficient realization of this area is used to develop a multiply accumulate unit that efficiently determines the result of such a sum-of-products function. According to the present invention, the result can be determined to an appropriate level of accuracy using a smaller circuit area and less power.

In general, sum-of-products functions are widely used to implement desired processing of sampled signals. The constants $(C_0, C_1, C_2, \ldots)$ are selected to provide the appropriate signal processing of the sample values $(X_0, X_1, X_2, \ldots)$. According to the teachings of the present invention, the precise mathematical result of the sum-of-products function is recognized as more accurate than necessary for many applications. The present invention provides a multiply accumulate unit that can resolve a sum-of-products function to a desired level of accuracy while providing benefits over conventional multiply accumulate units in terms of physical layout and operating speed.

Figure 2:
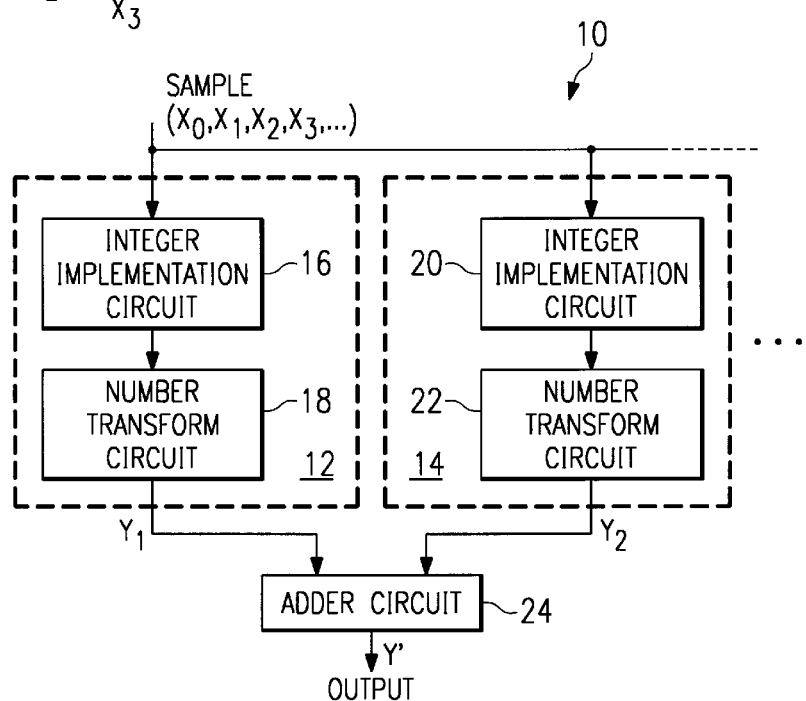
FIG. 2 is a block diagram of one embodiment of a multiply accumulate unit for processing a signal, constructed according to the teachings of the present invention.

FIG. 2 is a block diagram of one embodiment of a multiply accumulate unit for processing a signal, indicated generally at 10, constructed according to the teachings of the present invention. Multiply accumulate unit 10 receives sample values $(X_0, X_1, X_2, X_3, \ldots)$, sampled from a signal being processed. Multiply accumulate unit 10 operates to provide an output Y' which represents an approximation of the result Y of a sum-of-products function such as that shown in FIG. 1.

A first-order block 12 and a correction block 14 receive the sample values $(X_0, X_1, X_2, X_3, \ldots)$. First-order block 12 comprises an integer implementation circuit 16 which receives the sample values $(X_0, X_1, X_2, X_3, \ldots)$ and provides an output to a number transform circuit 18. Number transform circuit 18 provides an output, $Y_1$, of first-order block 12. The output, $Y_1$, comprises a first-order approximation of the sum-of-products function of FIG. 1.

Correction block 14 comprises an integer implementation circuit 20 which receives the sample values $(X_0, X_1, X_2, X_3, \ldots)$. Integer implementation circuit 20 provides an output to a number transform circuit 22. Number transform circuit 22 provides an output, $Y_2$, of correction block 14. The output, $Y_2$, comprises a correction to the first-order approximation provided by $Y_1$.

An adder circuit 24 receives the output, $Y_1$, of first-order block 12 and the output, $Y_2$, of correction block 14. Adder circuit 24 adds $Y_1$ and $Y_2$ and provides an output, Y', of multiply accumulate unit 10.

In operation, first-order block 12 operates to generate $Y_1$ as a first-order approximation of the area shown in FIG. 1. Correction block 14 operates to generate $Y_2$ as a correction to $Y_1$. Adder circuit 24 then adds the first-order approximation, $Y_1$, and the correction, $Y_2$, to provide an output Y'. It should be understood that additional correction blocks could be added to provide further correction such that the output Y' would more accurately represent the result Y of the sum-of-products function of FIG. 1. Correction units could be added until a desired accuracy is achieved.

Multiply accumulate unit 10 provides a technical advantage in that integer implementation circuits 16 and 20 and number transform circuits 18 and 22 can be implemented using adders and shifters and without multipliers.

Figure 3A:
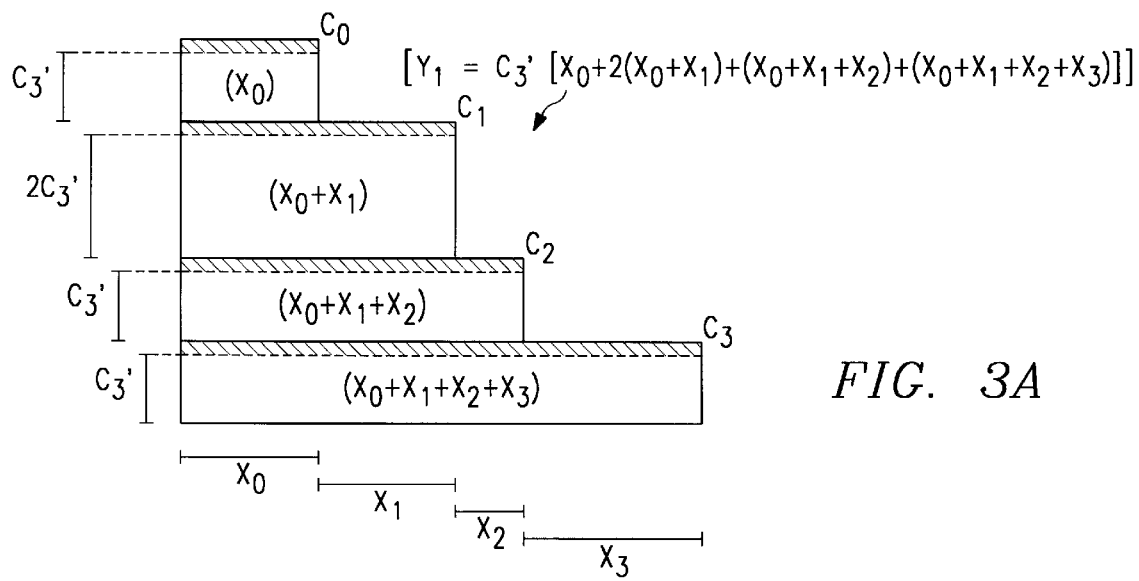
FIGS. 3A and 3B are graphical representations of one embodiment of the first-order approximation and correction implemented by the multiply accumulate unit of FIG. 2.
Figure 3B:
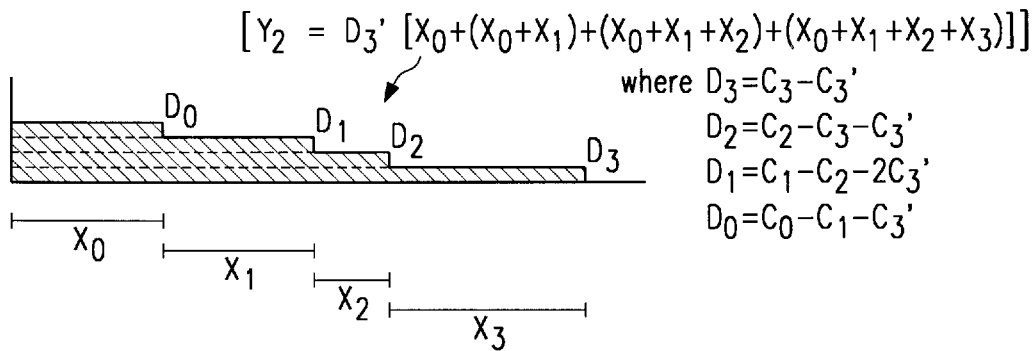

FIGS. 3A and 3B are graphical representations of one embodiment of the first order approximation, $Y_1$, and the correction, $Y_2$, implemented by multiply accumulate unit 10 of FIG. 2. FIGS. 3A and 3B limit the terms of the sum-of-products function at $C_3X_3$ for purposes of explanation. It should be understood that fewer or more terms could be implemented.

As shown in FIG. 3A, the area of FIG. 1 can be conceptualized as horizontal rectangles rather than vertical rectangles. According to the teachings of the present invention, the area of the horizontal rectangles can be approximated by multiply accumulate unit 10 to efficiently determine a result of the sum-of-products function to a desired level of accuracy.

As shown in FIG. 3A, the constants $(C_0, C_1, C_2, C_3)$ can be approximated as integer multiples of $C_3'$, which is an approximation of $C_3$. In this manner, $Y_1$ can be implemented as the function shown in FIG. 3A. This approximation allows $C_3'$ to be selected as a multiplication factor easily implemented in shift registers and adders and allows the integer multiples of the sample values $(X_0, X_1, X_2, X_3, \ldots)$ to be implemented in double adder structures.

FIG. 3B is a graphical representation of the error from the approximation, $Y_1$, of FIG. 3A. In FIG. 3B, the constants $(D_0, D_1, D_2, D_3)$ represent the difference between the constants $(C_0, C_1, C_2, C_3)$ and the approximation provided by $C_3'$ and multiples of $C_3'$.

The correction, $Y_2$, can similarly be implemented as an approximation of the actual area shown in FIG. 3B. An approximation $D_3'$ of the constant $D_3$ can be used to realize $Y_2$ in a manner similar to the approximation of FIG. 3A. Using the same principles, further corrections could be implemented to correct any error in the value of $Y_2$. However, for purposes of description, a first-order approximation and one correction are described.

Figure 4:
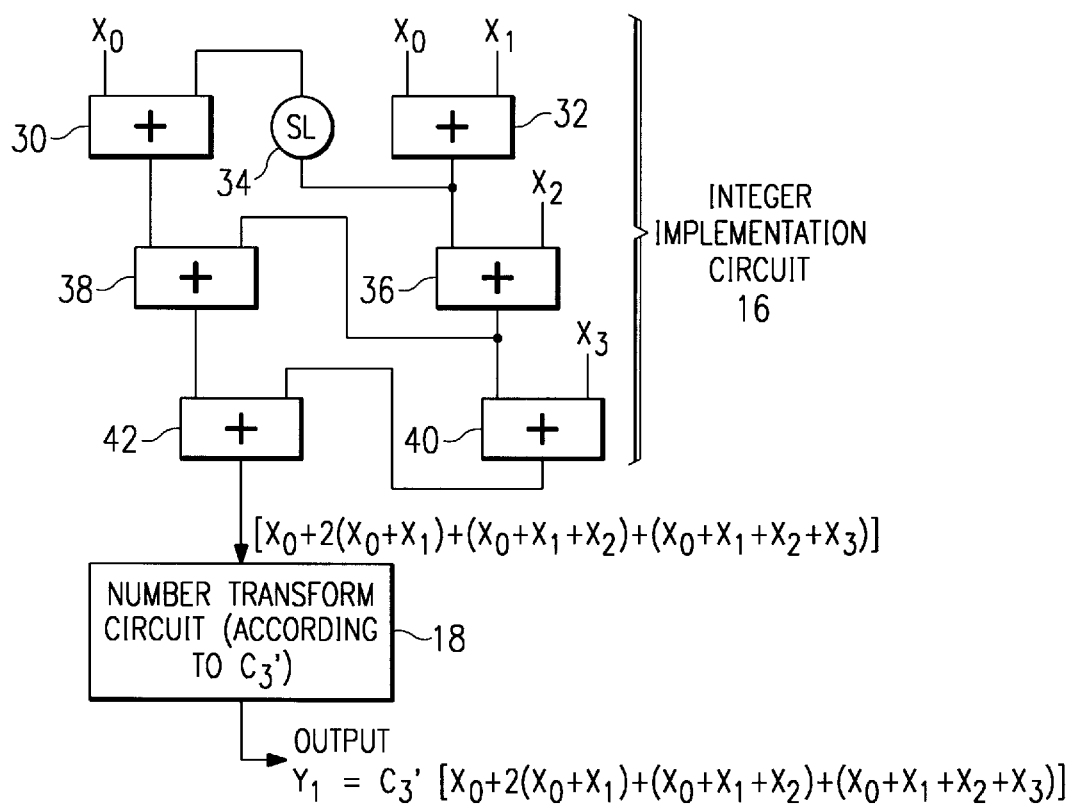
FIG. 4 a block diagram of one implementation of the multiply accumulate unit shown in FIG. 2.

FIG. 4 is a block diagram of one implementation of first-order block 12 of FIG. 2 according to the approximation shown in FIG. 3A. According to the teachings of the present invention, integer implementation circuit 16 has a double adder structure.

A first adder 30 receives the sample value $X_0$ and receives the shifted output of a second adder 32. Adder 32 receives the sample values $X_0$ and $X_1$. The output of adder 32 is shifted to the left once by shift register 34 such that the input to adder 30 is $2(X_0+X_1)$. A third adder 36 receives sample value $X_2$ and receives the output of adder 32. A fourth adder 38 receives the output of adder 30 and adder 36. A fifth adder 40 receives the sample value $X_3$ and the output of adder 36. Lastly, an adder 42 receives the output of adder 38 and adder 40.

The result of the double adder structure of integer implementation circuit 16 is the generation of the sum of integer multiples of the sample values $(X_0, X_1, X_2, X_3)$, as shown. The sum shown as the output of integer implementation circuit 16 is the factor shown in FIG. 3A which is multiplied by the constant $C_3'$.

Number transform circuit 18 receives the output of integer implementation circuit 16 and transforms that output to provide output $Y_1$. Number transform circuit 18 transforms the output of integer implementation circuit 16 to represent multiplication by the constant $C_3'$. According to the teachings of the present invention, number transform circuit 18 does not use multipliers. Due to the choice of $C_3'$, number transform circuit 18 can comprise shift registers and adders.

$C_3'$ can be chosen in order to realize the first-order approximation, $Y_1$, by allowing the values of constants ($C_0, C_1, \ldots, C_i$) to be relaxed and to vary. A binary number can be chosen such that it is an integral divisor into constants ($C_0, C_1, \ldots, C_i$) with as small a range of quotient as possible and it can be easily realized as a product of the form $(1+-\frac{1}{2}^{m1})*(1+-\frac{1}{2}^{m2})$. For example, $$C_1 = C_1'(\frac{1}{2}^{m0})*(1+-\frac{1}{2}^{m1})*(1+-\frac{1}{2}^{m2})$$

$$C_0' = I_0 * N_0$$

$$C_1' = I_1 * N_0$$

$$C_2' = I_2 * N_0$$

where, $I_0, I_1, I_2$ are small integers; and $C_0', C_1', \ldots, C_i'$ are approximations of $C_0, C_1, \ldots, C_i$. The form of $C_1$ can be contrasted with binary numbers which typically are represented as $$N = (\frac{1}{2}^{m0})*(1+-\frac{1}{2}^{m1}+-\frac{1}{2}^{m2})$$

It should be noted that wiring resource requirements to implement the expression for $C_1$ is less while maintaining the same number of adder bits. There is a trade-off in the complexity of $C_1$ compared to the number of adder bits required to realize $I_0, I_1, \ldots, I_i$. However, the integer sum-of-products can benefit from a coupled adder structure like that shown in FIG. 4.

The double adder structure is advantageous in that the overall delay is less than the product of delay of an adder and a number of stages. In fact a carry wave is generated that makes the overall delay that of (N+BW) one bit adders, where N is the number of stages and BW is the bit-width of the resulting word. This structure enjoys good track sharing and small interconnect length. Low power circuits are possible due to small fan-out and the local nature of blocks.

Once the computation of the first-order approximation is completed, correction circuits can be designed using essentially the same method. A new number that is an approximate common factor of residues and realizable as a product of $(1+/-\frac{1}{2}^m)$ terms and shifts is used to realize corrections. Additional advantages can be realized by keeping the word-width as small as possible. This tends to reduce power and active area. However, area of the overall cell may be determined by the largest bit-width and not affected as much. The present invention allows a synthesis procedure that leads to low power implementation of a multiply accumulate unit and is useful in realizing many devices used to process signal samples.

An example implementation is provided below and is based upon part of IDCT that is used in MPEG. A multiply accumulate unit used in IDCT can be described as follows:

$$Y = \cos(11.25)*X_1 + \cos(33.75)*X_2 -$$

$$\cos(56.25)*X_3 + \cos(87.75)*X_4$$

$$= 9.807852804470013 E - 01 * X_1 +$$

$$8.314696126764918 E - 01 * X_2 +$$

$$5.555702339523534 E - 01 * X_3 +$$

$$1.950903235564853 E - 01 * X_4$$

If a number for representing the first-order approximation is chosen to be $C_{4'} = 0.2$, it can be seen that $$Y_1 = C_4' * (5*X_1 + 4*X_2 + 3*X_3 + X_4)$$

is a good first approximation.

In addition, $(\frac{1}{8})*(1+\frac{1}{2})*(1+\frac{1}{16}) = 0.19922$ is a relatively accurate representation of $C_4'$. So, Y can be rewritten as $$Y = (1/8)*(1+1/2)*1+1/16*$$

$$(X_1 + (X_1 + X_2) + 2*(X_1 + X_2 + X_3) +$$

$$(X_1 + X_2 + X_3 + X_4)) + Y_2$$

$$= Y_1 + Y_2$$

$$Y_2 = -0.01531 * X_1 + 0.03459 * X_2 - 0.04209 *$$

$$X_3 - 0.00412968 * X_4$$

As an approximation of $Y_2$, it can be seen that the multiplicand of $X_2$ is $(2.25*0.01531)$ and that of $X_3$ is $(2.75*0.01531)$ and that of $X_4$, $(0.25*0.01531)$. By taking a weighted average, the factor of $3.844e^{-3}$ can be used as an overall multiplication factor. In the interest of realizability, $(1-\frac{1}{64})/256 = 3.84521e^{-3}$ is a reasonable implementation. Using this, $Y_2$ can be implemented as:

$$Y_2 = Y_3 + (1 - 1/64)/256 * (-4*X_1 + 9*X_2 - 11*X_3 - X_4)$$

$$= Y_3(1 - 1/64)/256 * (-1) * (2*X_3 + 5*$$

$$(X_3 - X_2) + 3(X_3 - X_2 + X_1) + (X_3 - X_2 + X_1 + X_4))$$

$$= Y_3 + (1 - 1/64)/256 * (-1) * (4*(X_1 - 2*X_2 + 3*X_3) +$$

$$(X_3 - X_2 - X_4))$$

$$= Y_3 + (1 - 1/64)/256 * (-1) * (4*(X_3 + (X_3 - X_2) +$$

$$(X_3 - X_2 + X_1)) + ((X_3 - X_2) + X_4))$$

$$Y_3 = 7.08e - 5 * X_1 - 1.689e - 5 * X_2 + 2.0731e - 4 * X_3 -$$

$$2.8447e - 4 * X_4$$

If needed, the same procedure can be used to implement $Y_3$. However, there is often an allowable error that would make it unnecessary to further correct the result. This can be true in devices where, using realizability as a criterion, a limited space of coefficients can be searched to get desired performance. One embodiment of a circuit implementation of the function $Y' = Y_1 + Y_2$, as set forth above, is shown in FIG. 5.

Figure 5:
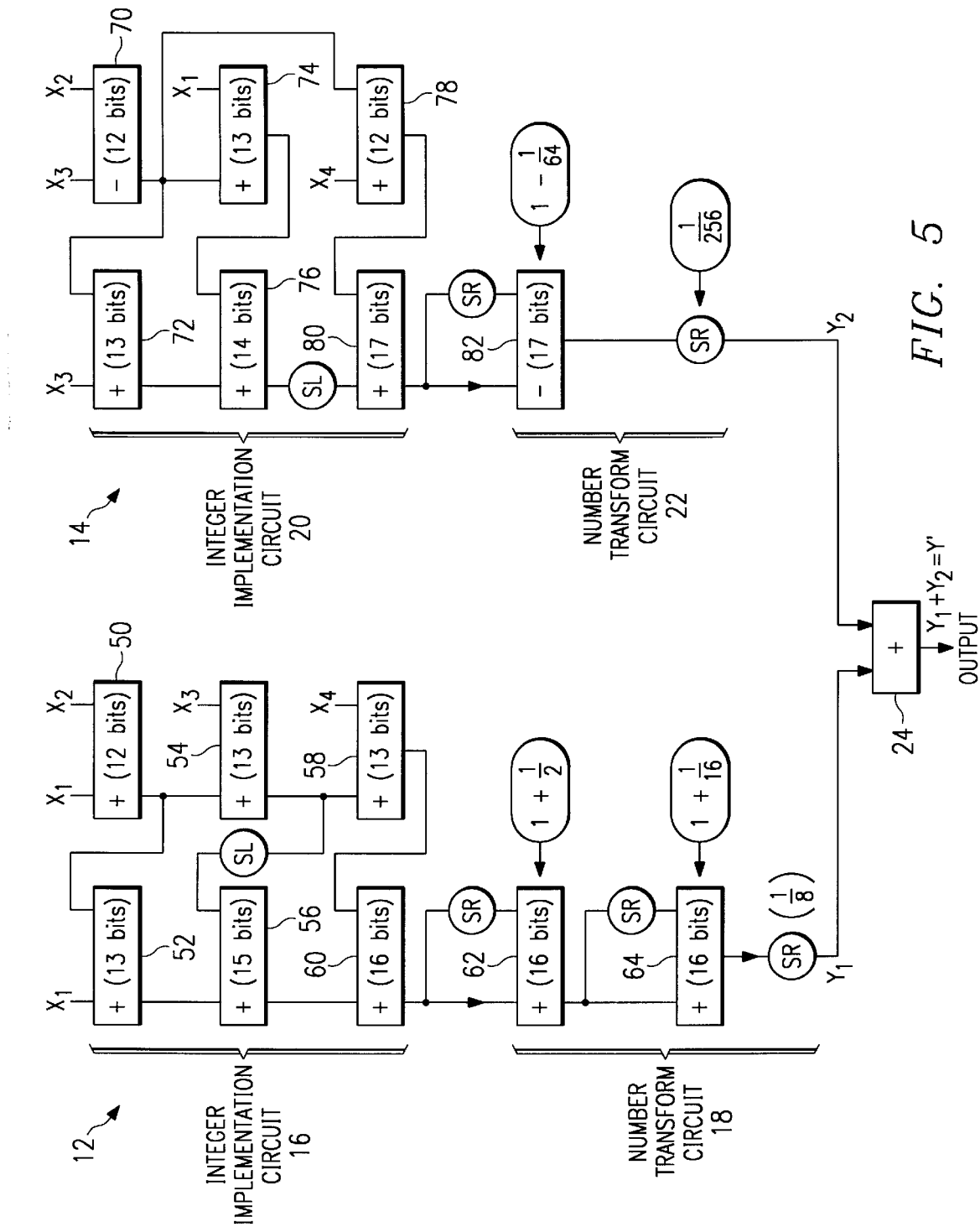
FIG. 5 is a block diagram of another implementation of the multiply accumulate unit shown in FIG. 2.

FIG. 5 is a block diagram of an implementation of multiply accumulate unit 10 constructed according to the teachings of the present invention. The multiply accumulate unit of FIG. 5 includes first-order block 12 and correction block 14. First-order block 12 and correction block 14 comprise integer implementation circuits 16 and 20 and number transform circuits 18 and 22, respectively.

Integer implementation circuit 16 comprises six adders interconnected in a double adder structure. Adder 50 receives sample values $X_1$ and $X_2$ and provides an output to adder 52 and adder 54. Adder 52 receives sample value $X_1$ and the output of adder 50. Adder 54 receives the output of adder 50 and sample value $X_3$. Adder 56 receives the output of adder 52 and the shifted output of adder 54. Adder 58 receives the output of adder 54 and sample value $X_4$. Lastly, adder 60 receives the output of adder 56 and the output of adder 58. Integer implementation circuit 16 provides an output representing the sum of integer multiples of sample values ($X_1, X_2, X_3, X_4$) as described above for $Y_1$.

Number transform circuit 18 receives the output of integer implementation circuit 16. Number transform circuit 18 comprises adder 62 which adds the output of adder 60 and the shifted output of adder 60. In this manner, adder 62 implements a multiplication of the output of adder 60 by a factor of (1+½). Similarly, adder 64 adds the output of adder 62 and the shifted output of adder 62 to implement a multiplication by a factor of (1+1/16). Lastly, the output of adder 64 is shifted to the right to implement a multiplication by a factor of (⅛). Thus, number transformer circuit 18 implements multiplication by a factor of (⅛)(1+½)(1+1/16) without the use of a multiplier. The resulting output of number transform circuit 18, $Y_1$, is provided to adder 24 and represents a first-order approximation as described above.

Integer implementation circuit 20 of correction block 14 comprises five adders and a subtractor. Subtractor 70 receives sample values $X_3$ and $X_2$ and subtracts $X_2$ from $X_3$. Adder 72 receives the output of subtractor 70 and receives sample value $X_3$. Adder 74 receives sample value $X_1$ and the output of subtractor 70. Adder 76 receives the output of adder 72 and the output of adder 74. Adder 76 receives sample value $X_4$ and the output of subtractor 70. Lastly, adder 80 receives the shifted output of adder 76 and the output of adder 78. Integer implementation circuit 20 produces an output comprising integer multiples of the sample values $(X_1, X_2, X_3, X_4)$ according to the correction, $Y_2$, described above. The output of integer implementation circuit 20 is provided to number transform circuit 22.

Number transform circuit 22 comprises a subtractor 82 that receives the output of adder 80 and the shifted output of adder 80. Subtractor 82 implements a multiplication of the output of adder 80 by a factor of (1−1/64). Number transform circuit 22 then shifts the output of subtractor 82 to the right such that multiplication by a factor of (1/256) is implemented. The output, $Y_2$, of correction block 14 implements a correction to the output of first-order block 12 as described above. The output, $Y_2$, is provided to adder 24 which adds $Y_1$ and $Y_2$ together to provide the output Y'.

Assuming $X_i$ are 12 bits, for example, an analysis of the number of bits required at each stage can be performed to build the stages with only the required width, thus saving power. The bit sizes shown in FIG. 5 provide an example of such a bit width analysis. The loading on $X_i$ is also reduced compared to conventional use of a multiplier. Delay can be estimated as a carry propagation of 16+8 bits of addition. For area estimation, besides the area of adders, the area associated with large shifts is also included. It should be understood that the implementation of FIG. 5 is not unique, and a synthesis program could be used to search the feasibility region to arrive at a better implementation.

Figure 6:
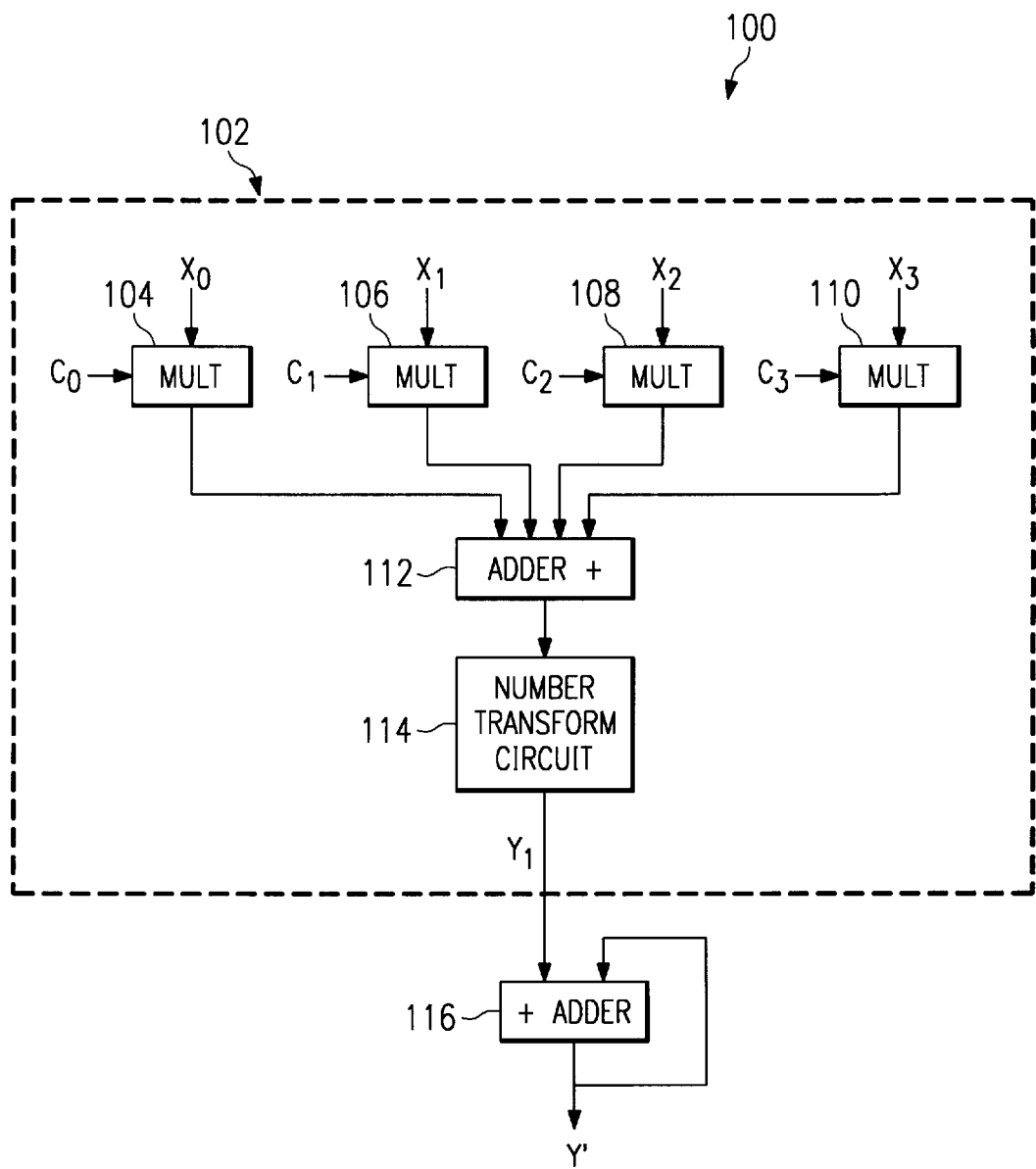
FIG. 6 is a block diagram of another embodiment of a multiply accumulate unit for processing a signal, constructed according to the teachings of the present invention.

FIG. 6 is a block diagram of another embodiment of a multiply accumulate unit for processing a signal, indicated generally at 100, constructed according to the teachings of the present invention. Multiply accumulate unit 100 has an architecture suitable for applications where coefficients need to be changed and is appropriate for use in a programmable device such as a digital signal processor.

According to the teachings of the present invention, multiply accumulate unit 100 receives sample values $(X_0, X_1, X_2, X_3)$ in parallel along with a portion of corresponding constants $(C_0, C_1, C_2, C_3)$. This use of full sample values $(X_0, X_1, X_2, X_3)$ in parallel accompanied by discrete portions of the constants $(C_0, C_1, C_2, C_3)$ provides a technical advantage in terms of selectability of accuracy, speed and size of multiply accumulate unit 100. As shown in FIG. 6, multiply accumulate unit 100 comprises a multiply-add block 102.

Multiply-add block 102 receives the sample values $(X_0, X_1, X_2, X_3)$. A first multiplier 104 receives sample value $X_0$ and receives a portion of a corresponding constant $C_0$. In the illustrated embodiment, each constant $(C_0, C_1, C_2, C_3)$ includes eight bits, and multiplier 104 initially receives the two most significant bits of constant $C_0$. Multiplier 106 receives sample value $X_1$ and receives a portion of corresponding constant $C_1$. In the eight bit embodiment, multiplier 106 initially receives the two most significant bits of constant $C_1$. Multiplier 108 and multiplier 110 likewise receive sample values $X_2$ and $X_3$ and receive portions of corresponding constants $C_2$ and $C_3$, respectively. Where the constants are eight bits, mulitpliers 108 and 110 initially receive the two most significant bits of $C_2$ and $C_3$, respectively.

Each multiplier 104, 106, 108, and 110 multiplies the associated sample value $(X_0, X_1, X_2, X_3)$ by the portion of the corresponding constant $(C_0, C_1, C_2, C_3)$. The output of each multiplier 104, 106, 108, and 110 are provided to adder 112. Adder 112 provides an output representing the sum of the four terms to a number transform circuit 114.

Number transform circuit 114 transforms the result from adder 112 as appropriate for the portion of the constants $(C_0, C_1, C_2, C_3)$ that was used. In one embodiment, number transform circuit 114 comprises a shift register operable to shift the output of adder 112. For example, in the eight bit constant embodiment, shift register 114 initially shifts the output of adder 112 to the left six bits because the two most significant bits of an eight-bit constant were used by each multiplier 104, 106, 108, and 110. The output of number transform circuit 114 is provided to adder 116.

Multiply-add block 102 can be used sequentially with successive portions of constants $(C_0, C_1, C_2, C_3)$ beginning with the most significant portions of constants $(C_0, C_1, C_2, C_3)$. In one embodiment, two-bit portions are used, but other implementations are possible.

Adder 116 adds sequential outputs of multiply-add block 102 to provide an output Y'. The number of sequential outputs can be from one to N where N sequences would implement the use of the entire constants $(C_0, C_1, C_2, C_3)$. Where the entire constants $(C_0, C_1, C_2, C_3)$ are not used, the output Y' represents an approximation of the actual result of the sum-of-products function:

$$Y = C_0 X_0 + C_1 X_1 + C_2 X_2 + C_3 X_3$$

and has a built-in error. However, the error produced by omitting some of the least significant bits of the constants $(C_0, C_1, C_2, C_3)$ may be negligible based upon the error margin of the application. In such a case, the multiply accumulate unit architecture of FIG. 6 can provide a multiply accumulate unit that is more efficient and consumes less space than would be required to determine the result using all of the bits of constants $(C_0, C_1, C_2, C_3)$.

According to the teachings of the present invention, regardless the size of each constant, the accuracy is selectable by using multiply-add block 102 in sequence with different portions of constants $(C_0, C_1, C_2, C_3)$. Further, it should be understood that other sizes and numbers of constants can be implemented as well.

The technical advantages of the architecture of FIG. 6 is the programmable nature of multiply accumulate unit 100. Number transform circuit 114 can be programmed to accomplish an appropriate shift. Further, the inputs to each multiplier can be programmed to accomplish desired accuracy. Thus, a digital signal processor that includes a multiply accumulate unit as shown in FIG. 6 could be programmable as to the number bits of the constants $(C_0, C_1, \ldots, C_1)$ used. With each pass, accuracy is increased and the computation can be halted when the desired accuracy is reached. For some implementations, the digital signal processor may only need one pass, while for others it may be desirable to use more.

In this manner, a single multiply accumulate unit can provide scalable performance. This allows, for example, one digital signal processor product to be used both for a function that requires high speed and relatively low accuracy and for a function that requires higher accuracy and has lower speed requirements.

Although the present invention has been described in detail, it should be understood that various changes, substitutions, and alterations can be made thereto without departing from the spirit and scope of the invention as defined by the appended claims.

What is claimed is:

1. A multiply accumulate unit for processing a signal according to a sum-of-products function based upon a plurality of multibit sampled values and a corresponding plurality of multibit constants, comprising;
   a multiply-add block operable to receive the plurality of sampled values and to receive a portion of each of the plurality of constants consisting of a predetermined number of bits, the multiply-add block further operable to provide an output representing a sum of each sampled value multiplied by the portion of a corresponding constant, said multiply-add block including
      a plurality of multipliers, each multiplier receiving one of the plurality of sampled values and the portion of a corresponding one of the plurality of constants, and each multiplier operable to provide an output representing a product of the one sampled value and the portion of the corresponding constant,
      an adder coupled to receive the outputs of the plurality of multipliers, the adder operable to provide an output representing a sum of the outputs of the plurality of multipliers,
      a shifter operable to receive the output of the adder, the shifter operable to shift the output of the adder responsive to a significance of the portion of the plurality of constants, and the shifter operable to provide an output representing the shifted result; and
   an adder coupled to receive the output of the multiply-add block and operable to generate a sum of sequential outputs of the multiply-add block, the adder further operable to provide an output representing the sum of sequential outputs of the multiply-add block employing the same sample values but portions of said corresponding constants having sequentially less significant bits such that the output provides a result of processing the signal according to the sum-of-products function.

2. The multiply accumulate unit of claim 1, wherein each of the plurality of constants comprises eight bits and the portion comprises two bits of the eight bits.

3. The multiply accumulate unit of claim 1, wherein each of the plurality of constants comprises eight bits, the portion comprises two bits of the eight bits and the multiply-add block is used twice such that four bits of each constant are used.

4. The multiply accumulate unit of claim 1, wherein said predetermined number of bits of the portion of the plurality of constants is programmable.

5. The multiply accumulate unit of claim 1, wherein the number of uses of the multiply-add block is programmable.

6. The multiply accumulate unit of claim 1, wherein a the multiply accumulate unit is implemented in an integrated circuit device.

7. The multiply accumulate unit of claim 1, wherein a the multiply accumulate unit is implemented in a digital signal processor.

8. A method for processing a signal according to a sum-of-products function based upon a plurality of sampled values and a corresponding plurality of constants, the method comprising:
   identifying a plurality of constants for a sum-of-products function according to which a plurality of sampled values are to be processed;
   receiving a plurality of sampled values of a signal being processed;
   selecting a predetermined number of next most significant bits for each of the plurality of constants, the next most significant bits for a first selection being most significant bits of each of the plurality of constants;
   generating a result of the sum-of-products function based upon the sampled values and the selected predetermined number of next most significant bits for each of the corresponding plurality of constants by simultaneously multiplying each sampled value by the selected next most significant bits of the corresponding constant forming a plurality of products and adding the plurality of products;
   adding the result of the most recent sum-of-products function to a sum of all prior sum-of-products functions; and
   repeating selecting, generating and adding until the sum of all prior sum-of-products functions has a desired level of accuracy.

* * * * *